United States Patent
Adachi

(10) Patent No.: US 10,775,189 B2
(45) Date of Patent: Sep. 15, 2020

(54) SYSTEM FOR DETERMINATION OF PORT ARRIVAL AND DEPARTURE, PORT ARRIVAL AND DEPARTURE DETERMINATION METHOD, AND RECORDING MEDIUM RECORDING PORT ARRIVAL AND DEPARTURE DETERMINATION PROGRAM

(71) Applicant: FUJITSU LIMITED, Kawasaki-shi, Kanagawa (JP)

(72) Inventor: Takayuki Adachi, Ebetsu (JP)

(73) Assignee: FUJITSU LIMITED, Kawasaki (JP)

( * ) Notice: Subject to any disclaimer, the term of this patent is extended or adjusted under 35 U.S.C. 154(b) by 170 days.

(21) Appl. No.: 16/055,541

(22) Filed: Aug. 6, 2018

(65) Prior Publication Data

US 2018/0348007 A1    Dec. 6, 2018

Related U.S. Application Data

(63) Continuation of application No. PCT/JP2016/054031, filed on Feb. 10, 2016.

(51) Int. Cl.
*G01C 21/36*    (2006.01)
*G01C 21/20*    (2006.01)
(Continued)

(52) U.S. Cl.
CPC .......... *G01C 21/3655* (2013.01); *B63B 49/00* (2013.01); *G01C 21/20* (2013.01);
(Continued)

(58) Field of Classification Search
CPC .. G01C 21/3655; G01C 21/203; G01C 21/20; G01C 21/3694; G01C 21/3682;
(Continued)

(56) References Cited

U.S. PATENT DOCUMENTS 5,818,335 A    10/1998   Rinsch et al.
2009/0058713 A1    3/2009   Okunishi et al.

FOREIGN PATENT DOCUMENTS

JP    5-233999    9/1993
JP    7-84027    3/1995
(Continued)

OTHER PUBLICATIONS

International Search Report, PCT/ISA/210, dated Apr. 19, 2016, in corresponding International Patent Application No. PCT/JP2016/054031.
(Continued)

*Primary Examiner* — Aaron L Troost
(74) *Attorney, Agent, or Firm* — Staas & Halsey LLP

(57) ABSTRACT

A system for determination of port arrival and departure, includes a memory and a processor coupled to the memory. The processor displays a map including sea areas, receives designation of a line on the displayed map, obtains position information on a vessel, and determines arrival to a port or departure from a port of the vessel according to movement of the vessel across the line between a first area corresponding to one side of sides of the line and a second area corresponding to the other side of the sides. The movement is detected based on the position information.

15 Claims, 12 Drawing Sheets

(51) Int. Cl.
*B63B 49/00* (2006.01)
*G08G 3/02* (2006.01)

(52) U.S. Cl.
CPC ......... *G01C 21/203* (2013.01); *G01C 21/367* (2013.01); *G01C 21/3682* (2013.01); *G01C 21/3694* (2013.01); *G08G 3/02* (2013.01); *B63B 2213/02* (2013.01)

(58) Field of Classification Search
CPC ........ G01C 21/367; G08G 3/02; B63B 49/00; B63B 2213/02
See application file for complete search history.

(56) References Cited

FOREIGN PATENT DOCUMENTS

| | | |
|---|---|---|
| JP | H07065299 A * | 3/1995 |
| JP | 9-507272 | 7/1997 |
| JP | 2002-32900 | 1/2002 |
| JP | 2002-117498 | 4/2002 |
| JP | 2004-227045 | 8/2004 |
| JP | 2006-148257 | 6/2006 |
| JP | 2007-140971 | 6/2007 |
| JP | 2007-140974 | 6/2007 |
| JP | 2009-103581 | 5/2009 |
| JP | 2010-160626 | 7/2010 |
| JP | 2014-65495 | 4/2014 |

OTHER PUBLICATIONS

International Written Opinion, PCT/ISA/237, dated Apr. 19, 2016, in corresponding International Patent Application No. PCT/JP2016/054031.

* cited by examiner

SYSTEM FOR DETERMINATION OF PORT ARRIVAL AND DEPARTURE, PORT ARRIVAL AND DEPARTURE DETERMINATION METHOD, AND RECORDING MEDIUM RECORDING PORT ARRIVAL AND DEPARTURE DETERMINATION PROGRAM

CROSS-REFERENCE TO RELATED APPLICATION

This application is a continuation application of International Application PCT/JP2016/054031 filed on Feb. 10, 2016 and designated the U.S., the entire contents of which are incorporated herein by reference.

FIELD

The embodiments discussed herein are related to a system for determination of port arrival and departure, a port arrival and departure determination method, and a recording medium on which a port arrival and departure determination program is recorded.

BACKGROUND

An automatic management system for port arrival and departure and a permission/refusal determination system for vessels arrived at a port are provided as techniques related to port arrival and departure of vessels.

Related techniques are disclosed in, for example, Japanese Laid-open Patent Publication Nos. 2002-032900 and 2007-140974.

SUMMARY

According to an aspect of the embodiments, a system for determination of port arrival and departure, the system includes a memory and a processor coupled to the memory, wherein the processor: displays a map including sea areas, receives designation of a line on the displayed map, obtains position information on a vessel, and determines arrival to a port or departure from a port of the vessel according to movement of the vessel across the line between a first area corresponding to one side of sides of the line and a second area corresponding to the other side of the sides, the movement being detected based on the position information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
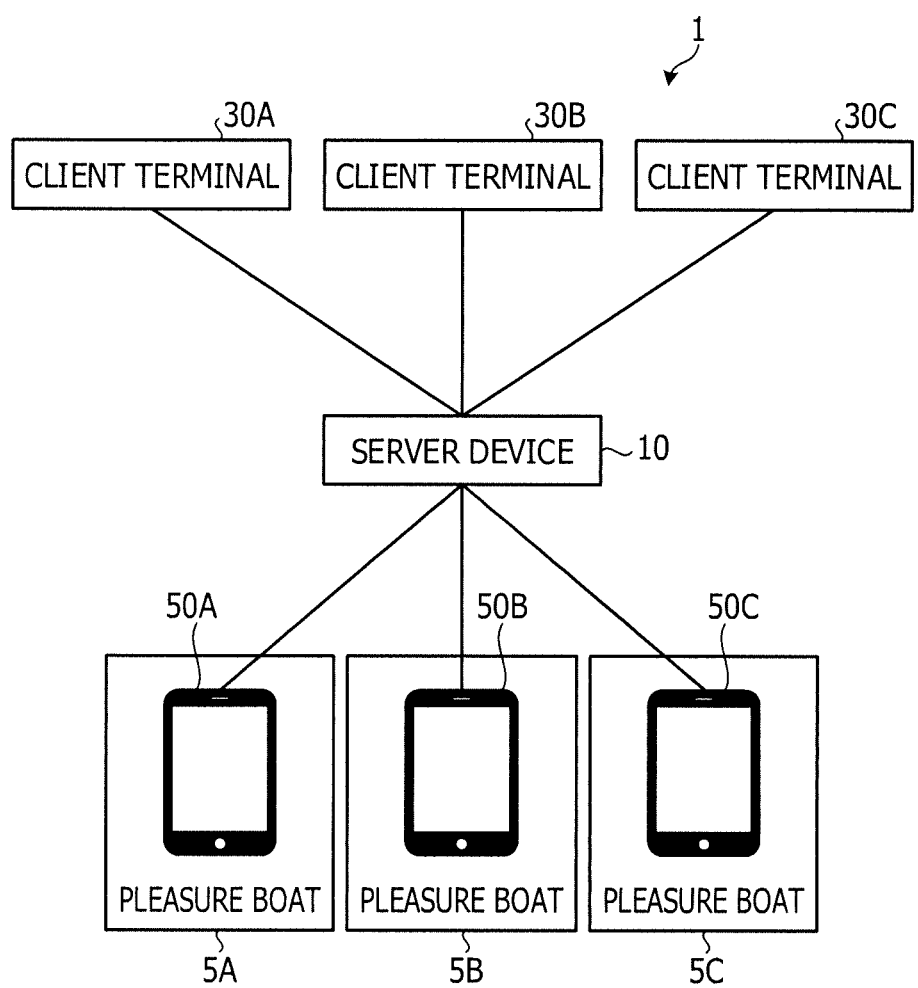
FIG. 1 is a diagram illustrating a configuration example of a navigation management support system according to a first embodiment.

For instance, in an automatic management system for port arrival and departure, a vessel 2 that generates data such as a logbook in database 1 recognizes the position of the vessel itself utilizing GPS system I. Entry and exit into and from a predetermined determination range 7 centered around a pier position 6 of the vessel 2 is detected by utilizing the GPS system I. The system operates under the condition that the vessel 2 is located within the determination range 7. A time determined to be a port arrival time or a port departure time along with other predetermined relevant data is written to the database 1 as the time of port arrival or port departure via a recording unit 19.

Also, in the permission/refusal determination system for arrived vessels, a vessel is detected within a predetermined detection area through which the vessel passes when arriving at a port, and permission information from an ID tag of the vessel is received. Multiple detection sensors are disposed in a direction in which vessels pass, and a traveling direction of each vessel is detected. In a detection area G, arrival or departure of a vessel 1 to or from the port is detected by distance sensors 11a, 11b. Arrival to the port or departure from the port of the vessel 1 is determined by passing of the vessel 1 through the detection area G.

For instance, when an automatic management system for port arrival and departure or a permission/refusal determination system for arrived vessels is utilized, arrival or departure of the vessel to or from a port would be automatically determined by detecting that the vessel enters a predetermined range from the port or the vessel sails out a predetermined range from the port.

However, for instance, there is a constraint that a boundary for determining arrival or departure of the vessel to or from a port may be set only in a uniform manner.

In general, the type of range based on which arrival or departure to or from a port is determined varies with the conditions of the location of the port. However, if a determination range centered around a pier is fixed as in the above-mentioned automatic management system for port arrival and departure, arrival or departure of a vessel to or from a port may only be determined based on the criterion that the vessel has approached the pier or sailed away from the pier. Also, in order to use the above-mentioned permission/refusal determination system for arrived vessels, equipment such as a distance sensor has to be installed. Otherwise, arrival or departure to or from a port may not be determined. Thus, the cost of a marina is increased.

For this reason, it is useful to devise the criteria based on which arrival or departure to or from a port is determined.

For instance, a port arrival and departure-related computer system may be provided, which allows a boundary for determining arrival to a port or departure from a port to be flexibly set.

Hereinafter a port arrival and departure-related computer system, a port arrival and departure determination method, and a port arrival and departure determination program according to the present application will be described with reference to the accompanying drawings. It is to be noted that these embodiments are not limited to the disclosed technique. The embodiments may be combined as appropriate in a range not causing contradiction between the contents for processing.

[First Embodiment]

[System Configuration]

FIG. 1 is a diagram illustrating a configuration example of a navigation management support system according to a first embodiment. The navigation management support system illustrated in FIG. 1 has marinas as users which are each a business operator who manages a port and provides a navigation management service that manages the operation of the vessels belonging to the port. In addition, the navigation management support system illustrated in FIG. 1 has the crew members of the vessels belonging to the port as end users, and provides a navigation management service that supports safe navigation.

These navigation management service and navigation support service are also applicable to especially small vessels, however, are advantageous in that the services may be directed to any classified type of vessels. Specifically, although large vessels are mandated to have marine equipment such as an automatic identification system (AIS), small vessels are not mandated to have the marine equipment. Due to this background, navigation management and navigation support of small vessels, particularly vessels utilized for marine leisure what is called pleasure boats 5A to 5C are more difficult as compared with large vessels.

Thus, the navigation management support system 1 utilizes the functions of mobile terminal devices 50A to 50C owned by the crew members of the pleasure boats 5A to 5C for the navigation management service and the navigation support service mentioned above. Hereinafter, the pleasure boats 5A to 5C may be collectively referred to as the "pleasure boat 5".

Here, as an example, a case will be exemplified in which the navigation management service and the navigation support service are applied to the pleasure boat 5. However, the navigation management service and the navigation support service may be applied to other small vessels, for instance, fishing boats. In addition, the navigation management service and the navigation support service may also be applied to large vessels by utilizing the existing techniques of the marine equipment.

As illustrated in FIG. 1, the navigation management support system 1 includes a server device 10, client terminals 30A to 30C, and mobile terminal devices 50A to 50C. Hereinafter, the client terminals 30A to 30C may be collectively referred to as the "client terminal 30". Also, the mobile terminal devices 50A to 50C may be collectively referred to as the "mobile terminal device 50". Although FIG. 1 illustrates the case where the server device 10 manages three client terminals 30 and three mobile terminal devices 50, the server device 10 may manage any number of client terminals 30 and mobile terminal devices 50 without being limited to the example of FIG. 1.

The server device 10 is a computer that provides the navigation management service to the client terminal 30.

As an embodiment, the server device 10 may be implemented by installing a navigation control program that implements the navigation management service to a desired computer as a packaged software or an online software. For instance, the server device 10 may be implemented as a Web server that provides the navigation management service, or implemented as a cloud that provides the navigation management service by outsourcing.

The client terminal 30 is a computer that receives the navigation management service from the server device 10. As an example, such client terminal 30 may be used by all relevant members of a marina, including the officers and managers of the marina.

As an embodiment, a personal computer may be used as the client terminal 30. The client terminal 30 is not limited to a non-portable information processing device such as the personal computer, and various mobile terminal devices lent to the relevant members by the marina may also be used as the client terminal 30. The category of the "mobile terminal device" mentioned herein include a mobile communication terminal such as a smartphone, a mobile phone, and a personal handyphone system (PHS) as well as a slate terminal and a tablet terminal.

For instance, the client terminal 30 accepts a login request to server device 10 by receiving input of account information assigned to the marina, for instance an identification (ID) and a password. When the login request is transmitted from the client terminal 30 to the server device 10, login authentication is performed by the server device 10. As a result, when the login authentication is successful, the client terminal 30 is able to receive the navigation management service related to the marina.

These server devices 10 and client terminal 30 are coupled to each other via a predetermined network. As an example, the network may use the Internet, and any type of communication network, such as a LAN and a virtual private network (VPN) regardless of wired or wireless communication.

The mobile terminal device 50 is utilized as a computer that provides the navigation support service. The "mobile terminal device 50" mentioned herein is designed to be used by the crew members of the pleasure boat 5, for instance, the operators of the boat, as an example.

As an embodiment, an application program that implements the navigation support service is installed in the mobile terminal device 50. Hereinafter, the application program that implements the navigation support service may be referred to as the "navigation support App". As an example of the navigation support service, the mobile terminal device 50 is able to issue various warnings which contribute to safe navigation by executing the navigation support App on the processor of the mobile terminal device 50.

Although detailed determination logic will be described later, as an aspect of the navigation support service, the mobile terminal device 50 automatically determines departure from a port and arrival to a port of the pleasure boat 5 in which the mobile terminal device 50 is mounted. In this manner, a port arrival and departure determination service is provided in which notification of departure or arrival of the pleasure boat 5 from or to a port is outputted by predetermined display device or voice output device, and a notification of departure or a notification of arrival of the pleasure boat 5 is uploaded to the server device 10, thereby causing the server device 10 to record a port at which the pleasure boat 5 has arrived or from which the pleasure boat 5 has departed. In addition to the port arrival and departure determination service, the mobile terminal device 50 issues various warnings including warning of dangerous objects such as shoal, a reef, and a fishing net only in a departure period from arrival to departure of the pleasure boat 5, warning of vessel operation which may cause the pleasure boat 5 to cross the border of a navigation range of the pleasure boat 5, determined by the skills, qualifications of the ship operators of the pleasure boat 5, and the size of the boat, warning of entry to an entry prohibited area such as a port or a river, warning of dragging of anchor to the pleasure boat 5 which anchors, warning of violation of sea route rules in general, and warning of large vessels.

As another aspect, the mobile terminal device 50 uploads position information measured by a position detector mounted in the mobile terminal device 50, for instance, a global positioning system (GPS) receiver to the server device 10 only in the departure period. Thus, the mobile terminal device 50 establishes the basis for providing the navigation management service to the client terminal 30. Under the basis, as an example, it is possible for the server device 10 to manage the arrival and departure of the pleasure boat 5 and the current position of the pleasure boat 5 after departure. In addition, the server device 10 may receive an emergency rescue request of the pleasure boat 5 from the mobile terminal device 50, may set symbols of dangerous objects for causing the mobile terminal device 50 to issue warning on the map covering the port and surrounding sea area under the jurisdiction of a marina, and may display the symbol of a pleasure boat 5 in which the mobile terminal device 50 is issuing some of the various warnings, among the symbols of vessels illustrated on the map in a display style different from the display style of other symbols.

Communication between these server device 10 and mobile terminal device 50 may be performed via any network coupled through a base station that manages the mobile terminal device 50. Although illustration is omitted, it goes without say that communication between the client terminal 30 and the mobile terminal devices 50 may be performed in a similar manner.

[Configuration of Server Device 10]

Figure 2:
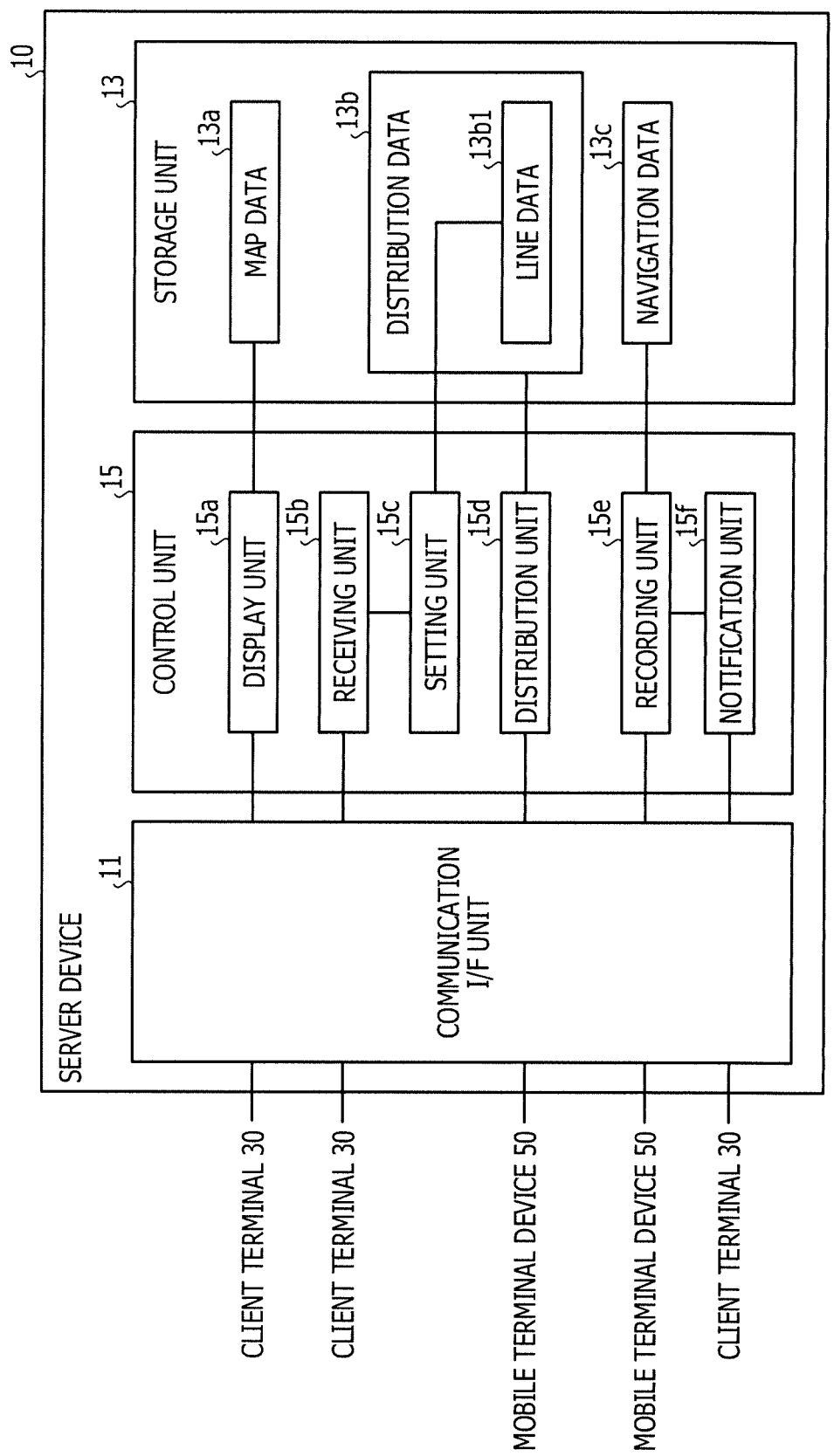
FIG. 2 is a block diagram illustrating the functional configuration of a server device according to the first embodiment.

FIG. 2 is a block diagram illustrating the functional configuration of the server device 10 according to the first embodiment. As illustrated in FIG. 2, the server device 10 includes a communication I/F unit 11, a storage unit 13, and a control unit 15. Although solid lines indicating relationship between input/output of data is illustrated in FIG. 2, a minimum portion of FIG. 2 is only illustrated for the sake of description. In other words, input/output of data related to processing units is not limited to the example illustrated, and input/output of data other than illustrated, for instance, input/output of data between a processing unit and a processing unit, between a processing unit and data, or between a processing unit and an external device may be performed.

The communication I/F unit 11 is an interface that performs communication control between other devices, for instance, the client terminal 30 and the mobile terminal device 50.

As an embodiment, a network interface card such as a LAN card may be adopted as an aspect of the communication I/F unit 11. For instance, the communication I/F unit 11 transmits to the client terminal 30 display data of the map covering the port and surrounding sea area under the jurisdiction of a marina, and receives a boundary line designated on the map, indicating an entrance to the port, from the client terminal 30. Also, the communication I/F unit 11 receives a download request for a navigation support App from the mobile terminal device 50, a notification of departure or a notification of arrival of the pleasure boat 5, and position information on the pleasure boat 5, and transmits the navigation support App and position information on dangerous objects to the mobile terminal device 50.

The storage unit 13 is a storage device that stores data used for various programs such as an operating system (OS) executed by the control unit 15, and an application program that implements the navigation management service.

As an embodiment, the storage unit 13 may be mounted as an auxiliary storage device in the server device 10. For instance, a hard disk drive (HDD), an optical disc, and a solid state drive (SSD) may be used as the storage unit 13. It is to be noted that the storage unit 13 does not have to be mounted as an auxiliary storage device, and may be mounted as the main memory device in the server device 10. In this case, various semiconductor memory elements, for instance, a random access memory (RAM) or a flash memory may be used.

The storage unit 13 stores map data 13a, distribution data 13b, and navigation data 13c as examples of data used for programs executed by the control unit 15. The storage unit 13 may also store attribute information on the vessel, for instance, information on the vessel name, the captain name, and the number of crew members other than the map data 13a, the distribution data 13b, and the navigation data 13c. The distribution data 13b out of the map data 13a, the distribution data 13b, and the navigation data 13c will be described in a situation where line data 13b1 included in the distribution data 13b is generated and registered.

The map data 13a is electronic data of nautical charts. The nautical charts includes the types of chart such as a general chart, a sailing chart, a general chart of coast, a coast chart, and a harbor chart. All or part of these is stored in the storage unit 13 as the map data 13a.

The navigation data 13c is data related to navigation.

As an embodiment, the navigation data 13c may use data including items such as a marina ID, a departure ID, a vessel ID, scheduled departure date/time, scheduled arrival date/time, departure date/time, arrival date/time, and the current position. The "marina ID" mentioned here refers to identification information on the marina, and an identifier in any system may be used, for instance, as long as the identifier allows the server device 10 to identify the marina. Also, "departure ID" refers to information that identifies a vessel which departs from a port managed by the marina, and for instance, among clearance notices with the same date of scheduled departure date/time, numbers are assigned in the order in which the clearance notices are submitted. Also, the "vessel ID" refers to information that identifies a vessel, and for instance, a vessel number assigned to a vessel may be used as the vessel ID. A vessel number may be called a "vessel identification number".

As an example, at the stage when a clearance notice is submitted to the marina, a value may be registered in each of the items of the "departure ID", the "vessel ID", the "scheduled departure date/time", and the "scheduled arrival date/time" among the all items. For instance, when the marina receives a clearance notice on the Web or when a business operator that provides the navigation management service and the navigation support service receives a clearance notice on the Web acting in the position of the marina, the departure ID, the vessel ID, the scheduled departure date/time, and the scheduled arrival date/time included in electronic data of the clearance notice may be registered in the storage unit 13 in association with the marina ID of the marina to which the clearance notice is submitted.

Also, when a departure notification is received from the mobile terminal device 50, the date/time at which the departure notification is received is registered for the first time in the "departure date/time". On the other hand, when an arrival notification is received from the mobile terminal device 50, the date/time at which the arrival notification is received is registered for the first time in the "arrival date/time". Furthermore, each time position information is uploaded every predetermined time, for instance, one minute from the mobile terminal device 50 in which the status related to port arrival and departure is set to "during departure", the uploaded position information is overwritten to the "current position".

Figure 3:
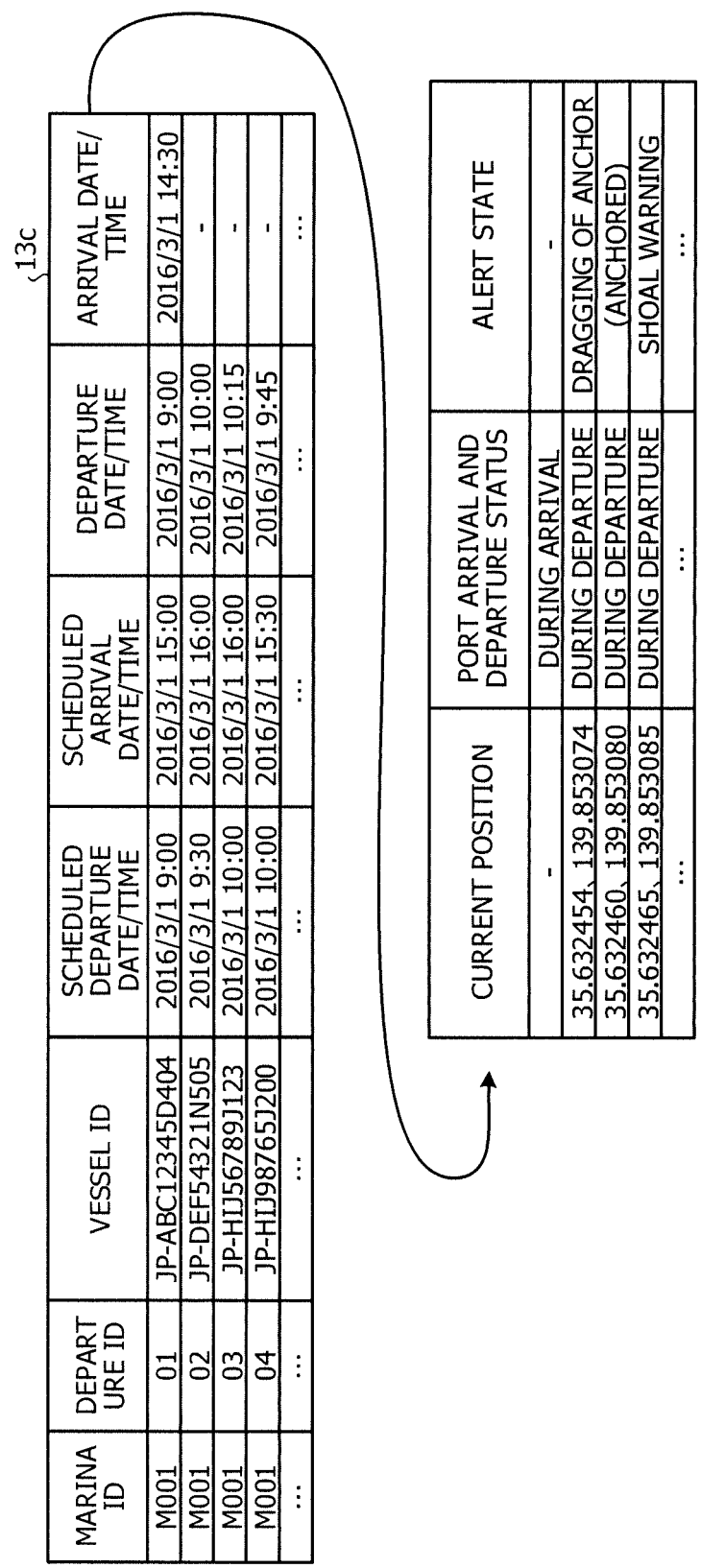
FIG. 3 is a table illustrating an example of navigation data.

FIG. 3 is a table illustrating an example of the navigation data 13c. As an example, FIG. 3 selectively illustrates the records related to the marina identified by marina ID "M001". The example of the navigation data 13c illustrated in FIG. 3 indicates a situation where the vessel identified by vessel ID "JP-ABC 12345D404" departed from the marina identified by marina ID "M001", and already arrived at the marina. Furthermore, the example of the navigation data 13c illustrated in FIG. 3 indicates a situation where the vessel identified by vessel ID "JP-DEF54321N505", the vessel identified by vessel ID "JP-HIJ56789J123", and the vessel identified by vessel ID "JP-HIJ987653200" are being departing from the marina identified by marina ID "M001". Among these vessels, in the vessel identified by vessel ID "JP-DEF54321N505", an alert of "dragging of anchor" is outputted, and in the vessel identified by vessel ID "JP-HIJ987653200", an alert of "shoal warning" is outputted. Also, in the vessel identified by vessel ID "JP-HIJ567893123", an alert is not outputted, but a notification indicating that the vessel has anchored, that is, the vessel is laid up has been uploaded.

The aforementioned table example is an example, and for instance, the field of status may not be provided, and items other than those may be added and stored. When a type of alert is received from the later-described data transfer unit 58e (an upload unit 58c), an alert state may be stored in association with the vessel ID. Also, as long as the above-mentioned data items are stored and referred to in association with each other, the data items do not have to be collectively stored in one table, and may be divided and managed in multiple tables.

The control unit 15 has an internal memory that stores various programs and control data, and executes various processing by these programs and control data.

As an embodiment, the control unit 15 is mounted as a central processing unit (CPU). The control unit 15 does not have to be mounted as a CPU, and may be mounted as a micro processing unit (MPU). The control unit 15 may be implemented by hard-wired logic such as an application specific integrated circuit (ASIC) or a field programmable gate array (FPGA).

The control unit 15 virtually implements the processing units in the following by loading a navigation control program as a process into the storage unit 13 on the work area of RAM such as a dynamic random access memory (DRAM) or a static random access memory (SRAM) mounted as the main memory unit which is not illustrated, the navigation control program being stored as an application program that implements the navigation management service.

For instance, the control unit 15 has a display unit 15a, a receiving unit 15b, a setting unit 15c, a distribution unit 15d, a recording unit 15e, and a notification unit 15f as illustrated in FIG. 2.

The display unit 15a is a processing unit that displays a map on the client terminal 30.

As an embodiment, when the display unit 15a receives a setting request for a boundary line used for determination of port arrival and departure on a menu screen (not illustrated) displayed on the client terminal 30, the display unit 15a performs the following processing. For instance, the display unit 15a identifies the marina ID from an account which is used at the time of login authentication by the client terminal 30 which has made the setting request for a boundary line. Next, for the marina ID owned by a marina, the display unit 15a refers to jurisdiction data (not illustrated) associated with a jurisdictional range including the port and surrounding sea area managed by the marina, for instance, a rectangular area, and further identifies a jurisdictional area corresponding to the previously identified marina ID. The display unit 15a then retrieves map data including the jurisdictional area corresponding to the previously identified marina ID from the map data 13a stored in the storage unit 13. Then, the display unit 15a transmits the previously retrieved map data to the client terminal 30, and displays the map of the jurisdictional area of the marina on the client terminal 30.

The receiving unit 15b is a processing unit that receives designation of a line on the map.

As an embodiment, the receiving unit 15b receives designation of the coordinates of two points on the map of the jurisdictional area of the marina displayed on the client terminal 30, and thereby receives designation of a boundary line indicating an entrance to the port. For instance, the receiving unit 15b receives a first operation, for instance, left click. Thus, the receiving unit 15b receives the start point of a boundary line. Subsequently, the receiving unit 15b receives a second operation, for instance, double click. Thus, the receiving unit 15b receives the end point of a boundary line. Then, the receiving unit 15b stores the coordinates of two points previously designated in the work area of an internal memory which is not illustrated.

Figure 4:
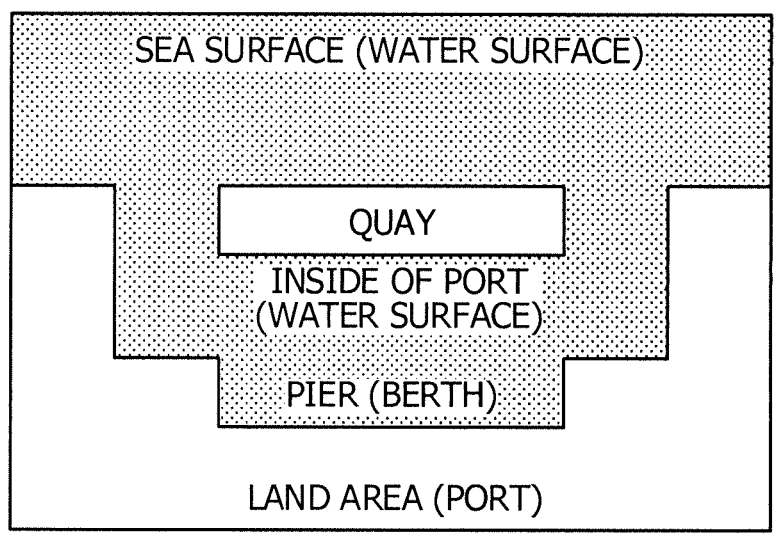
FIG. 4 is a view illustrating an example screen displayed on a client terminal.
Figure 5:
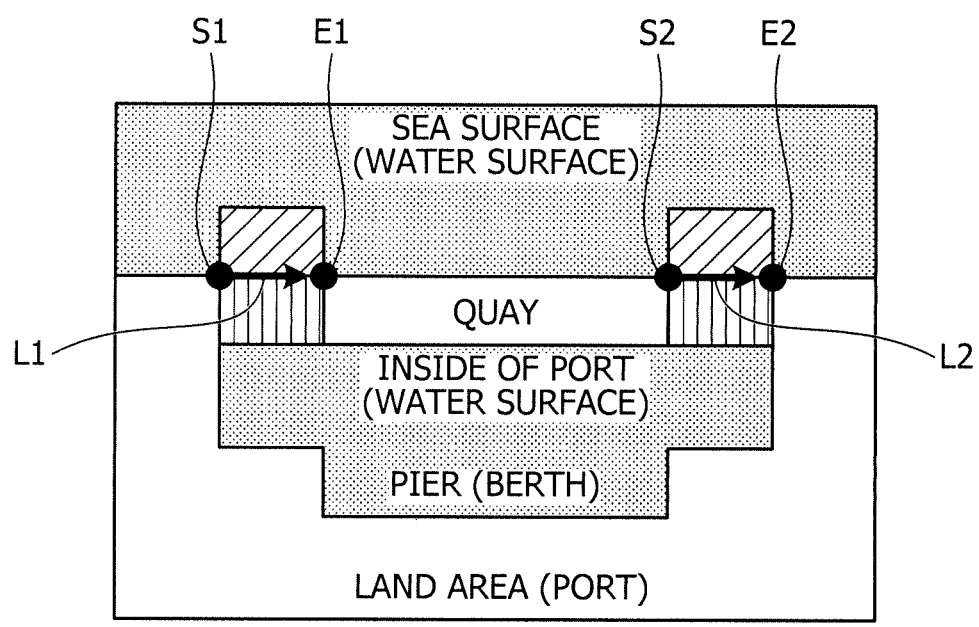
FIG. 5 is a view illustrating an example screen displayed on a client terminal.

FIG. 4 and FIG. 5 are each a view illustrating an example screen displayed on the client terminal 30. FIG. 4 illustrates a screen on which the map of the jurisdictional area of the marina is displayed, and FIG. 5 illustrates a state where designation of the start point and the end point of a boundary line is received on the screen illustrated in FIG. 4. In FIG. 4 and FIG. 5, a situation is assumed where a port is managed by the marina, and the inside of the port and the outside of the port are divided by a quay. By displaying the screen illustrated in FIG. 4 on the client terminal 30, it is possible for the relevant members of the marina to understand that setting a boundary along the quay allows departure or arrival from and to the port of a vessel to be determined. In this case, as illustrated in FIG. 5, designation of a boundary line L1 is received by designation of a start point 51 and an end point E1 as well as designation of a boundary line L2 is received by designation of a start point S2 and an end point E2.

When the boundary line L1 and the boundary line L2 are designated in this manner, in a situation where departure or arrival of the pleasure boat 5 is determined by the mobile terminal device 50, a first area and a second area which are set on the right and left of the boundary line L1 and the boundary line L2 may be displayed for confirmation. Among these, "the first area" indicates the water surface area inside the port adjacent to the boundary line L1 or L2, and is illustrated by vertical stripe hatching in FIG. 5 as an example. On the other hand, "the second area" indicates the water surface area outside the port adjacent to the boundary line L1 or L2, and is illustrated by horizontal stripe hatching in FIG. 5 as an example. Here, an example is illustrated in which the first area is displayed on the right side of a designated direction of a boundary line determined by the order of receiving the start point and the end point of the boundary line, specifically, the direction from the start point of the boundary line to the end point of the boundary line, and the second area is displayed on the left side of the designated direction of the boundary line. In this manner, a setting operation of defining the first area or the second area on which side of the right and the left of the designated direction of the boundary line may be omitted by associating the designated direction of the boundary line with the direction of setting the first area and the second area.

Figure 6:
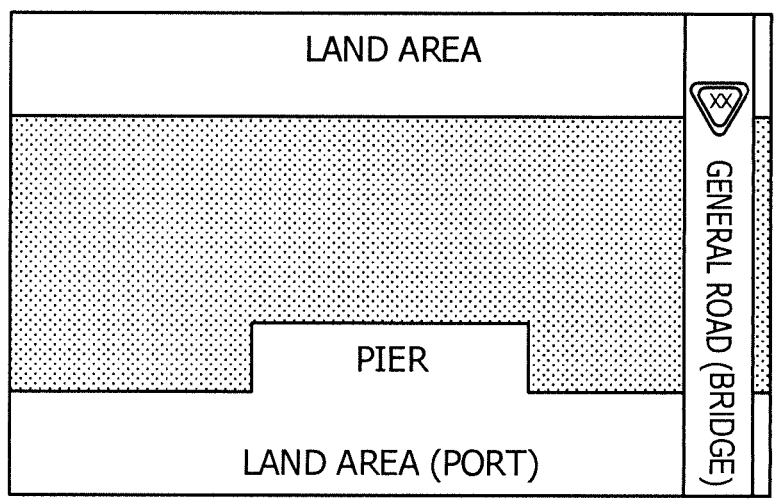
FIG. 6 is a view illustrating an example screen displayed on a client terminal.
Figure 7:
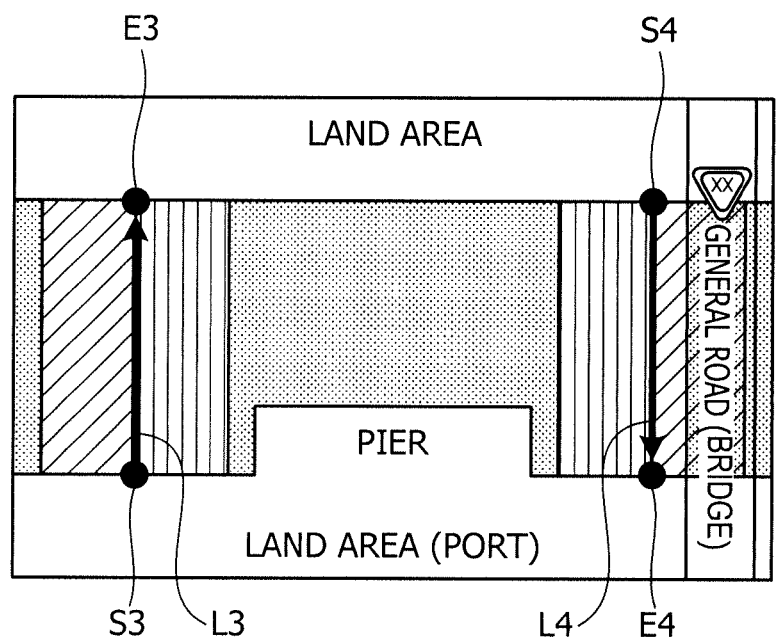
FIG. 7 is a view illustrating an example screen displayed on a client terminal.

FIG. 6 and FIG. 7 are each a view illustrating an example screen displayed on the client terminal 30. FIG. 6 illustrates a screen on which the map of the jurisdictional area of the marina is displayed, and FIG. 7 illustrates a state where designation of the start point and the end point of a boundary line is received on the screen illustrated in FIG. 6. In FIG. 6 and FIG. 7, a situation is assumed where a port in which a pier (berth) is provided on one side of a river is managed by the marina. By displaying the screen illustrated in FIG. 6 on the client terminal 30, it is possible for the relevant members of the marina to understand that setting two boundary lines in the direction crossing the river so as to sandwich the berth allows departure or arrival from and to the port of a vessel to be determined. In this case, as illustrated in FIG. 7, designation of a boundary line L3 is received by designation of a start point S3 and an end point E3 as well as designation of a boundary line L4 is received by designation of a start point S4 and an end point E4. Specifically, as described above, the rule holds that the first area is set on the right side of the designated direction of the boundary line as well as the second area is set on the left side of the designated direction of the boundary line. For this reason, the boundary line L3 is designated by receiving the start point S3 in the bank on the lower side of the screen of both banks of the river, then receiving the end point E3 in the bank on the upper side of the screen. On the other hand, the boundary line L4 is designated by receiving the end point E4 in the bank on the lower side of the screen of both banks of the river, then receiving the start point S4 in the bank on the upper side of the screen.

For defining an area within a certain distance away from the boundary line as the first area and the second area, a predetermined value may be used. 50 m may be used as an example of the predetermined value. In order to define the first area and the second area including areas within certain distances away from the boundary line, the certain distances may be the same distance, or may be different distances. Although FIG. 5 illustrates an example in which the first area and the second area are each displayed, these areas do not have to be displayed on the screen. Although FIG. 5 and FIG. 7 illustrate an example in which the first area and the second area are each displayed, these areas do not have to be displayed on the screen.

As illustrated in FIG. 4 to FIG. 7, a boundary line may be flexibly set by receiving designation of two points on the map of the jurisdictional area of the marina regardless of the conditions of the location of the port managed by the marina.

Here, as an example, a case has been exemplified where designation of a boundary line is received by two operations of left click and double click. However, as long as an operation allows the coordinates of two points to be designated via a graphical user interface (GUI) for general purpose, the operation may be any operation, for instance, drag & drop. Also, the operation is not limited to an operation of receiving via GUI, and an operation for two points may be received via a command line interface (CUI).

The setting unit 15c is a processing unit that sets a boundary line.

As an embodiment, when designation of a boundary line is received by the receiving unit 15b, the setting unit 15c sets and registers line data 13b1 in the storage unit 13, the line data 13b1 having records each of which has entries including marina ID, coordinates of the start point of a boundary line, and coordinates of the end point of a boundary line. Thus, the boundary line is managed for each marina. Here, as an example, a case has been exemplified where a boundary line is defined by the coordinates of two points: the start point and the end point. However, a boundary line may be defined by a polygonal line having at least three points, or defined using other information. For instance, a boundary line may be defined by one of the start point and the end point, the angle of a line segment extending from the one of the start point and the end point, and the length of the line segment.

The distribution unit 15d is a processing unit that performs distribution to the mobile terminal device 50.

As an embodiment, when receiving a download request for a navigation support App from the mobile terminal device 50, the distribution unit 15d distributes the distribution data 13b stored in the storage unit 13 to the mobile terminal device 50. The distribution data 13b includes the data of the navigation support App, and the line data 13b1. When the line data 13b1 between these is distributed, the distribution unit 15d does not have to distribute the data for all records included in the line data 13b1. For instance, the distribution unit 15d sets the search key of the marina ID included in the download request from the mobile terminal device 50, retrieves records including the marina ID as the search key from the records included in the line data 13b1, and distributes the retrieved records to the mobile terminal device 50. For instance, the distribution unit 15d may identify the marina ID (specifically, the ID of the marina to which a clearance notice is submitted) based on the departure ID or the vessel ID included in the download request from the mobile terminal device 50, retrieve records associated with each marina ID included in the sea area managed by the marina identified by the marina ID, and distribute the records to the mobile terminal device 50.

The recording unit 15e is a processing unit that performs recording related to port arrival and departure.

As an embodiment, when receiving a departure notification from the mobile terminal device 50, the recording unit 15e performs the following processing. Specifically, the recording unit 15e records the date/time at which the departure notification was received in the departure date/time of the records having the same marina ID and departure ID as the marina ID and the departure ID included in the departure notification among the records stored as the navigation data 13c in the storage unit 13. Here, a case has been exemplified where both a marina ID and a departure ID are used for record search under the assumption that duplicate departure IDs are assigned between marinas. However, when different departure IDs are assigned between marinas, records may be searched using only a departure ID. Also, when receiving an arrival notification from the mobile terminal device 50, the recording unit 15e performs the following processing. Specifically, the recording unit 15e records the date/time at which the arrival notification was received in the arrival date/time of the records having the same marina ID and departure ID as the marina ID and the departure ID included in the departure notification among the records stored as the navigation data 13c in the storage unit 13. In addition, each time the recording unit 15e is notified of position information from the mobile terminal device 50, the recording unit 15e performs the following processing. Specifically, the recording unit 15e overwrites and updates the current position of a record with the position information, the record having the same marina ID and departure ID as the marina ID and the departure ID notified along with the position information among the records stored as the navigation data 13c in the storage unit 13.

The notification unit 15f is a processing unit that performs notification to the client terminal 30.

As an embodiment, when receiving an arrival notification from the mobile terminal device 50, the notification unit 15f performs the following processing. Specifically, the notification unit 15f identifies one of the client terminals 30 which is associated with the account of the marina ID included in the arrival notification. In addition, to the identified client terminal 30, the notification unit 15f performs arrival notification related to the vessel ID associated with the marina ID and the navigation ID included in the arrival notification among the vessel IDs included in the records stored as the navigation data 13c in the storage unit 13. As an example of the arrival notification, a message indicating that the vessel with the vessel ID has arrived may be displayed on the client terminal 30, attribute information (not illustrated) associated with the vessel ID, such as a vessel name and a captain name, may be displayed on the client terminal 30, and scheduled arrival date/time and arrival date/time associated with the vessel ID may be displayed side by side.

[Configuration of Mobile Terminal Device 50]

Figure 8:
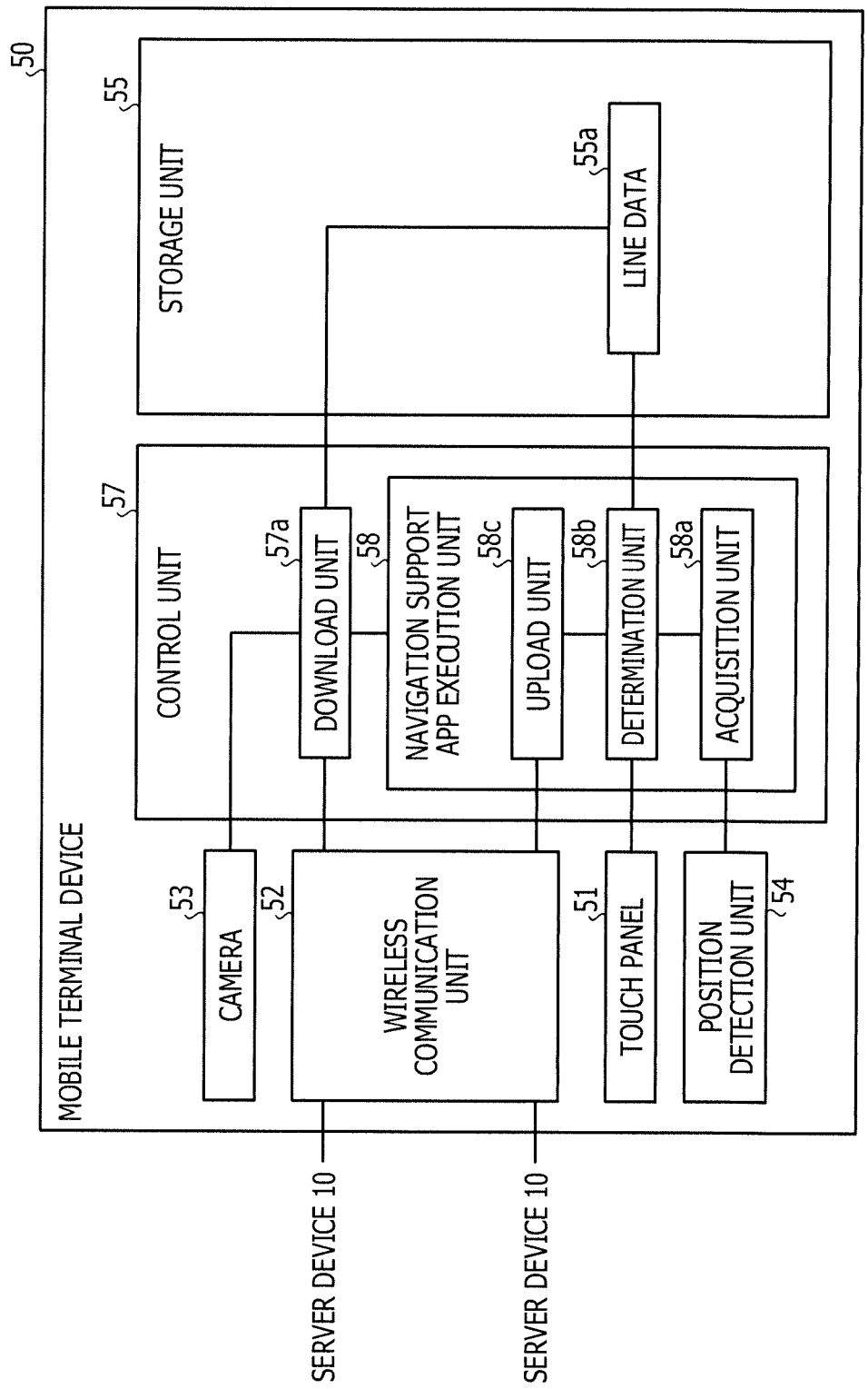
FIG. 8 is a block diagram illustrating the functional configuration of a mobile terminal device according to the first embodiment.

FIG. 8 is a block diagram illustrating the functional configuration of the mobile terminal device 50 according to the first embodiment. As illustrated in FIG. 8, the mobile terminal device 50 has a touch panel 51, a wireless communication unit 52, a camera 53, a position detection unit 54, a storage unit 55 and a control unit 57. It is to be noted that various functional units included in a known mobile terminal device other than the functional units illustrated in FIG. 8, for instance, a voice output unit may be included.

The touch panel 51 is a device via which displaying and inputting are possible.

As an aspect regarding display, the touch panel 51 displays images outputted by the OS executed on the mobile terminal device 50 as well as an application program such as the navigation support App. As an aspect regarding input, the touch panel 51 receives a touch operation such as tap, flick, sweep, pinch in, and pinch out to be performed on the screen of the touch panel 51. Here, the touch panel 51 has been exemplified as an example of the display unit. However, the display unit does not have to have both functions of display and input, and a device capable of implementing only a display function may be mounted.

The wireless communication unit 52 is a processing unit that transmits and receives data to and from another device, for instance, the server device 10 via a mobile communication network coupled to a base station which is coupled to the wireless communication unit 52 via an antenna which is not illustrated.

The camera 53 is an imaging device that captures an image.

As an embodiment, imaging elements such as a charge coupled device (CCD) and a complementary metal oxide semiconductor (CMOS) are mounted in the camera 53. For instance, light receiving elements in at least three types such as red (R), green (G), and blue (B) may be mounted in the camera 53.

The position detection unit 54 is a type of hardware that detects the position of the mobile terminal device 50.

As an embodiment, the position detection unit 54 may use a GPS receiver that measures the position based on time information transmitted from multiple GPS Satellites. The position thus measured by the GPS receiver does not have to be used as it is, and various corrections may also be made using position information transmitted from a base station coupled to the mobile terminal device 50.

The storage unit 55 is a storage device that stores data used by the OS executed on the control unit 57 as well as various programs such as an application program.

As an embodiment, the storage unit 55 may also be mounted as the main storage unit in the server device 10. For instance, various semiconductor memory elements, for instance, a RAM such as a DRAM and a SRAM, and a flash memory may be used. It is to be noted that the storage unit 55 does not have to be mounted as the main memory unit, and may also be mount as an auxiliary storage device of the mobile terminal device 50. In this case, a HDD, an optical disc, and an SSD may be used as the storage unit 55.

As an example of data used for a program executed by the control unit 57, the storage unit 55 stores line data 55a in which the boundary line is defined. In addition to the line data 55a, the storage unit 55 may collectively store data of the navigation support App distributed from the server device 10 and user data of the mobile terminal device 50.

The control unit 57 is a processing unit that is responsible for the entire control of the mobile terminal device 50.

As an embodiment, the control unit 57 is mounted as the central processing unit so-called CPU. The control unit 57 does not have to be mounted as the central processing unit, and may be mounted as an MPU. Also, the control unit 57 may be implemented by a hard-wired logic such as an ASIC and a FPGA.

As illustrated in FIG. 8, the control unit 57 has a download unit 57a and a navigation support App execution unit 58.

The download unit 57a is a processing unit that executes various types of download.

Here, an example of a method of downloading the navigation support App installed in the mobile terminal device 50 will be described. For instance, download of the navigation support App is started triggered by reading of a two-dimensional bar code issued by a marina via the camera 53 of the mobile terminal device 50. Examples of a situation where the two-dimensional bar code is read includes a situation where a clearance notice is submitted to the marina. When a clearance notice is submitted to a marina like this, a departure ID is assigned by the server device 10, then a new record is generated in the navigation data 13c, the new record including the departure ID, the marina ID of the marina to which the clearance notice is submitted, a vessel ID accepted in the clearance notice, scheduled departure date/time, and scheduled arrival date/time which are associated with each other. Subsequently, address information such as a URL accessible to the server device 10, the marina ID, and the departure ID are coded. Consequently, a two-dimensional bar code including the marina ID and the departure ID is generated. Subsequently, paper on which the two-dimensional bar code is printed, or the screen of a display device which displays the two-dimensional bar code is captured by the camera 53, and the two-dimensional bar code including the URL, the marina ID, and the departure ID is read.

When the two-dimensional bar code including the URL, the marina ID, and the departure ID is read in this manner, the download unit 57a refers to the address of the URL, and makes a download request to the server device 10 for the navigation support App including the marina ID and the departure ID. Consequently, the navigation support App included in the distribution data 13b, and the data of records corresponding to the marina ID included in the download request among the records included in the line data 13b1 are downloaded from the server device 10. The data of records of the line data 13b1 thus downloaded from the server device 10 is registered in the storage unit 55 as the line data 55a. In addition, the marina ID and the departure ID are also registered in the storage unit 55 in order to identify the marina to which the pleasure boat 5 belongs and the body of the pleasure boat 5 on the server device 10. Subsequently, the download unit 57a boots the navigation support App execution unit 58 by loading the navigation support App downloaded from the server device 10 into a work area of a RAM such as the storage unit 55.

The mobile terminal device 50 is able to start provision of the navigation support service by starting up the navigation support App like this. It is to be noted that after being started up in the mobile terminal device 50, the navigation support App continues to run in the background until departure and arrival submitted in the clearance notice are completed even when start-up operation is not performed by a user.

As illustrated in FIG. 8, the navigation support App execution unit 58 has an acquisition unit 58a, a determination unit 58b, and an upload unit 58c.

The acquisition unit 58a is a processing unit that acquires position information.

As an embodiment, the acquisition unit 58a acquires position information from the position detection unit 54 each time a position is detected by the position detection unit 54. As an example of the position information, the coordinates of latitude and longitude are acquired.

The determination unit 58b is a processing unit that determines arrival or departure of a vessel to or from a port.

As an embodiment, when the navigation support App is started up, the determination unit 58b makes the following initial setting. Specifically, the determination unit 58b sets a storage area on the work area of the storage unit 55 to store a status indicating an arrival state or a departure state of the pleasure boat 5 associated with a user of the mobile terminal device 50. In addition, the determination unit 58b sets a storage area to store an inside flag indicating whether or not the pleasure boat 5 is present in the first area set based on the boundary line defined by the line data 55a. Furthermore, the determination unit 58b sets a storage area to store an outside flag indicating whether or not the pleasure boat 5 is present in the second area set based on the boundary line defined by the line data 55a. After these storage areas are set, the determination unit 58b initializes the status to "during arrival", and initializes the inside flag and the outside flag to "OFF". The determination unit 58b then reads the line data 55a from the storage unit 55. Subsequently, for each of the records included in the line data 55a, the determination unit 58b sets the first area and the second area according to the coordinates of the start point of the boundary line and the coordinates of the end point of the boundary line in the record. For instance, the determination unit 58b sets the first area that is a rectangular area having a predetermined width from the boundary line on the right side of the direction from the start point of the boundary line to the end point of the boundary line, that is, on the first quadrant side. Also, the determination unit 58b sets the second area that is a rectangular area having a predetermined width from the boundary line on the left side of the direction from the start point of the boundary line to the end point of the boundary line, that is, on the second quadrant side.

After such initial setting is made, each time position information is acquired by the acquisition unit 58a, the determination unit 58b performs the following processing. Specifically, the determination unit 58b determines whether or not the coordinates of latitude and longitude included in the position information acquired by the acquisition unit 58a are included in the first area stored in the work area of the storage unit 55. At this point, when the position information indicates that the position is included in the first area, it may be determined that the pleasure boat 5 during arrival has approached the first area adjacent to the boundary line. In this case, the determination unit 58b sets the inside flag stored in the work area of the storage unit 55 to "ON".

When the position information is not included in the first area, the determination unit 58b further determines whether or not the position information indicates that the position is included in the second area stored in the work area of the storage unit 55. At this point, when the position information indicates that the position is not included in the second area, it may be determined that the pleasure boat 5 during arrival has not even approached the first area adjacent to the boundary line, including a case where a user of the mobile terminal device 50 is not on the pleasure boat. In this case, the determination unit 58b sets the inside flag stored in the work area of the storage unit 55 to "OFF".

Also, when the position information indicates that the position is included in the second area, the determination unit 58b determines whether or not the inside flag stored in the work area of the storage unit 55 is "ON". Here, when the inside flag is "ON", it is found that the flow of the position information on the pleasure boat 5 makes a transition in the order of "the first area", and "the second area". This indicates that the pleasure boat 5 has crossed the boundary line, which is equivalent to that the pleasure boat 5 has passed from the inside the port to the outside the port in the entrance of the port set by the marina. In this case, the determination unit 58b updates the status stored in the work area of the storage unit 55 to "during departure". Along with this, upload of a departure notification including the marina ID and the departure ID is performed by the later-described upload unit 58c.

On the other hand, even when the position information indicates that the position is included in the second area, if the inside flag is "OFF", the status stored in the work area of the storage unit 55 is not updated to "during departure". This is because when it is not confirmed that the flow of the position information on the pleasure boat 5 makes a transition in the order of "the first area", and "the second area", a situation may be considered where the pleasure boat 5 has not departed as described below. For instance, as illustrated in FIG. 7, even when the position information on the mobile terminal 50 indicates that the position is present on the second area adjacent to the left side of the designated direction of the boundary line L4, that is, the hatching of horizontal stripes illustrated in FIG. 7, the mobile terminal 50 may not be present on the water surface of the second area. This is because a general road is laid out on the second area, and there is a possibility that the mobile terminal device 50 is present on the general road. In such a case, when the flow of the position information on the pleasure boat 5 makes a transition in the order of "the first area", and "the second area", there is a high possibility that the pleasure boat 5 has passed the entrance of the port set by the marina. However, when the presence of the mobile terminal device 50 in the first area is not confirmed before the presence of the mobile terminal device 50 in the second area is confirmed, it may be determined that there is a higher possibility that the mobile terminal device 50 is present on the general road. Thus, the status is not updated to "during departure".

In this manner, each time position information is acquired, determination of entry into the first area, determination of entry into the second area, and update of the inside flag are repeatedly performed until the status is updated from "during arrival" to "during departure".

Subsequently, when the status is updated to "during departure", each time position information is acquired by the acquisition unit 58a, the following processing is performed. Specifically, the determination unit 58b determines whether or not the coordinates of latitude and longitude included in the position information acquired by the acquisition unit 58a are included in the second area stored in the work area of the storage unit 55. At this point, when the position information indicates that the position is included in the second area, it may be determined that the pleasure boat 5 during departure has approached the second area adjacent to the boundary line. In this case, the determination unit 58b sets the outside flag stored in the work area of the storage unit 55 to "ON".

When the position information indicates that the position is not included in the second area, the determination unit 58b further determines whether or not the position information indicates that the position is included in the first area stored in the work area of the storage unit 55. At this point, when the position information indicates that the position is not included in the first area, it may be determined that the pleasure boat 5 during departure has not approached the second area adjacent to the boundary line. In this case, the determination unit 58b sets the outside flag stored in the work area of the storage unit 55 to "OFF".

Also, when the position information indicates that the position is included in the first area, the determination unit 58b determines whether or not the outside flag stored in the work area of the storage unit 55 is "ON". Here, when the outside flag is "ON", it is found that the flow of the position information on the pleasure boat 5 makes a transition in the order of "the second area", and "the first area". This indicates that the pleasure boat 5 has crossed the boundary line, which is equivalent to that the pleasure boat 5 has passed from the outside the port to the inside the port in the entrance of the port set by the marina. In this case, the determination unit 58b updates the status stored in the work area of the storage unit 55 to "during an arrival". Along with this, upload of an arrival notification including the marina ID and the departure ID is performed by the later-described upload unit 58c.

On the other hand, even when the position information indicates that the position is included in the first area, if the outside flag is not "ON", that is, "OFF", the status stored in the work area of the storage unit 55 is not updated to "during arrival". This is because when it is not confirmed that the flow of the position information of the mobile terminal device 50 makes a transition in the order of "the second area", and "the first area", there is a higher possibility that the mobile terminal device 50 is present on facilities such as the general road without passing through the second area.

In this manner, each time position information is acquired, determination of entry into the second area, determination of entry into the first area, and update of the outside flag are repeatedly performed until the status is updated from "during departure" to "during arrival".

The upload unit 58c is a processing unit that performs various types of upload.

As an embodiment, the upload unit 58c uploads a departure notification or an arrival notification to the server device 10 according to an instruction from the determination unit 58b. In addition, the upload unit 58c uploads position information measured by the position detection unit 54 to the server device 10 only in a departure period since update of the status stored in the work area of the storage unit 55 to "during departure" until the status is updated to "during an arrival". When upload of position information is performed like this, each time position information is measured by the position detection unit 54, the position information may be uploaded. However, the position information may be uploaded in a cycle longer than the cycle in which the position detection unit 54 samples position information. Consequently, when the pleasure boat 5 is during arrival, upload of position information is reduced, and as a result, leakage of personal information on the mobile terminal device 50 may be reduced.

[Flow of Processing]

Subsequently, the flow of processing of the navigation management support system according to this embodiment will be described. Here, after (1) line setting processing performed by the server device 10 is described, (2) port arrival and departure determination processing performed by the mobile terminal device 50 will be described.

(1) Line Setting Processing

Figure 9:
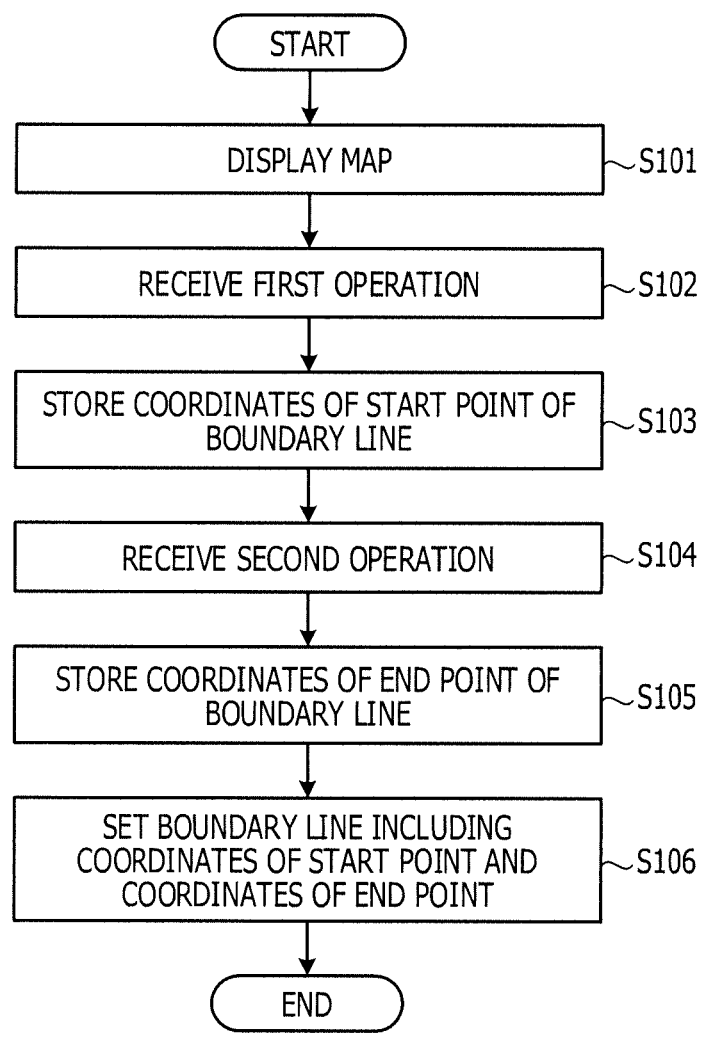
FIG. 9 is a flowchart illustrating the steps of line setting processing according to the first embodiment.

FIG. 9 is a flowchart illustrating the steps of line setting processing according to the first embodiment. As an example, the processing is performed when a setting request for a boundary line is received on a menu screen (not illustrated) displayed on the client terminal 30, the boundary line being used for determination of port arrival or departure.

As illustrated in FIG. 9, among the map data 13a stored in the storage unit 13, the display unit 15a retrieves map data including a jurisdictional area corresponding to a marina ID associated with the client terminal 30 that makes a setting request for a boundary line, and transmits the map data to the client terminal 30, thereby causing the client terminal 30 to display the map of the jurisdictional area of the marina (step S101).

Subsequently, the receiving unit 15b receives the first operation, for example, left-click on the map of the jurisdictional area of the marina displayed in step S101 (step S102). In response to this, the receiving unit 15b stores the coordinates of a start point of a boundary line in the work area of an internal memory which is not illustrated (step S103).

In addition, the receiving unit 15b receives the second operation, for example, double-click, on the map of the jurisdictional area of the marina displayed in step S101 (step S104). In response to this, the receiving unit 15b stores the coordinates of an end point of the boundary line in the work area of an internal memory which is not illustrated (step S105).

Subsequently, the setting unit 15c sets and registers line data 13b1 in the storage unit 13, the line data 13b1 having records each of which has entries including the marina ID associated with the client terminal 30 that has received the setting request for a boundary line, the coordinates of the start point of the boundary line stored in the internal memory in step S103, and the coordinates of the end point of the boundary line stored in the internal memory in step S105 (step S106), and completes the processing.

(2) Port Arrival and Departure Determination Processing

Figure 10:
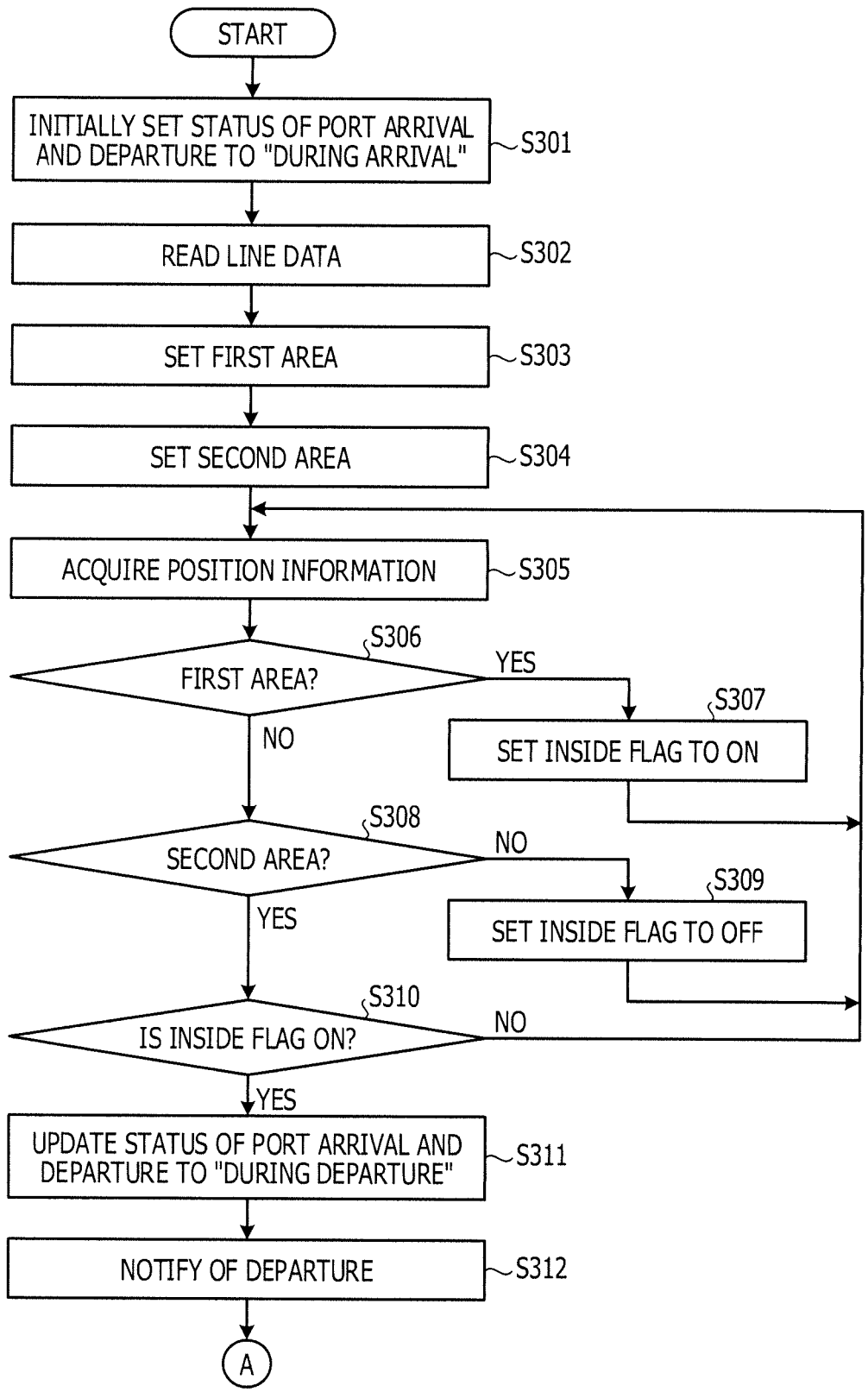
FIG. 10 is a flowchart (1) illustrating the steps of port arrival and departure determination processing according to the first embodiment.
Figure 11:
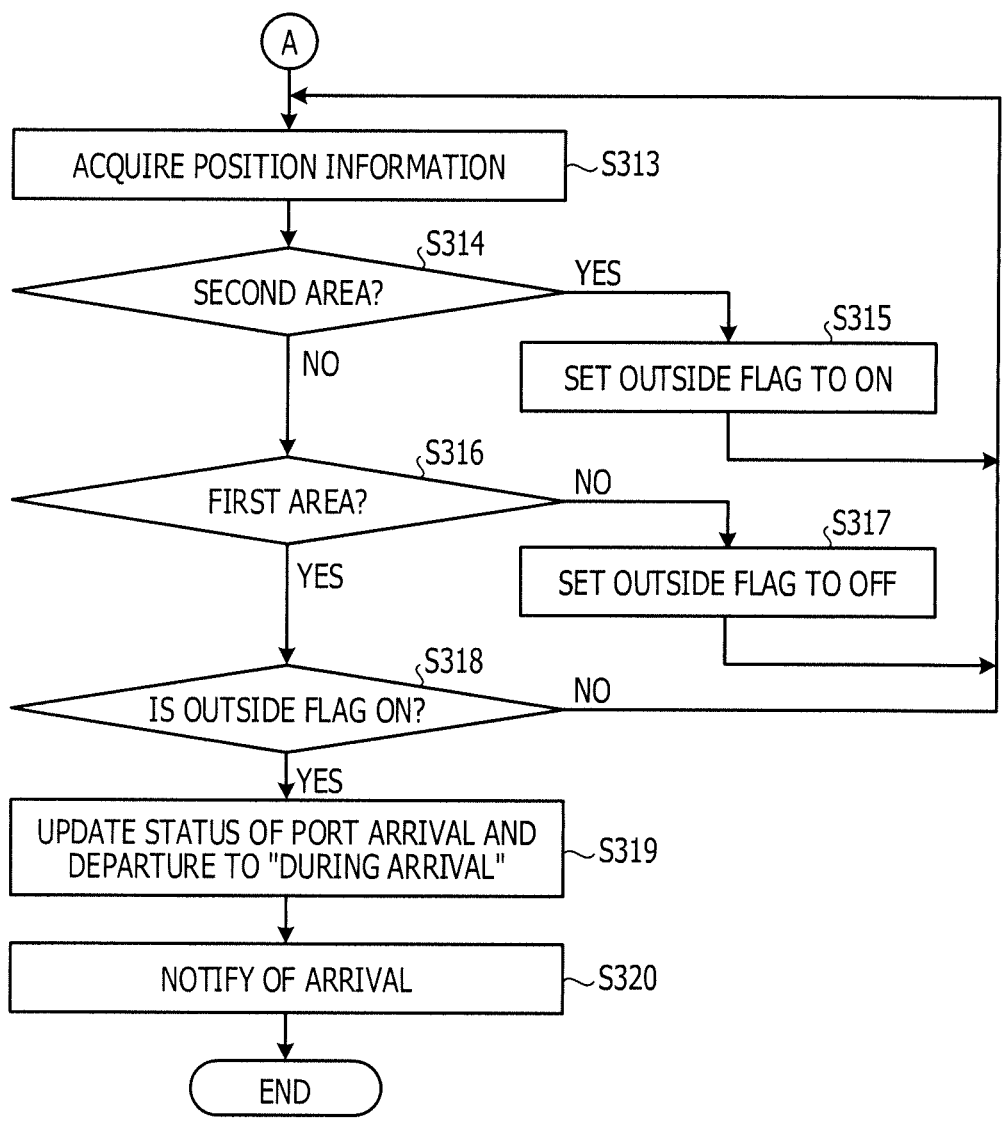
FIG. 11 is a flowchart (2) illustrating the steps of port arrival and departure determination processing according to the first embodiment.

FIG. 10 and FIG. 11 are each a flowchart illustrating the steps of port arrival and departure determination processing according to the first embodiment. As an example, the processing is started when a storage area that stores the status, a storage area that stores the inside flag, and a storage area that stores the outside flag are set on the work area of the storage unit 55.

As illustrated in FIG. 10, the determination unit 58b initializes the status to "during arrival", and initializes the inside flag and the outside flag to "OFF" (step S301). The determination unit 58b then reads the line data 55a from the storage unit 55 (step S302).

Subsequently, for each of the records included in the line data 55a read in step 302, the determination unit 58b sets the first area adjacent to the right side of a designated direction of a boundary line and the second area adjacent to the left side of the designated direction of the boundary line according to the coordinates of a start point of the boundary line and the coordinates of an end point of the boundary line in the record (step S303 and step S304).

The acquisition unit 58a then acquires position information measured by the position detection unit 54 (step S305). Subsequently, determination unit 58b determines whether or not the coordinates of latitude and longitude included in the position information acquired in step S305 are included in the first area stored in the work area of the storage unit 55 (step S306).

At this point, when the position information indicates that the position is included in the first area (Yes in step S306), it may be determined that the pleasure boat 5 during arrival has approached the first area adjacent to the boundary line. In this case, the determination unit 58b sets the inside flag stored in the work area of the storage unit 55 to "ON" (step S307), and proceeds to the processing in step S305.

When the position information is not included in the first area (No in step S306), the determination unit 58b further determines whether or not the position information indicates that the position is included in the second area stored in the work area of the storage unit 55 (step S308).

At this point, when the position information indicates that the position is not included in the second area (No in step S308), it may be determined that the pleasure boat 5 during arrival has not even approached the first area adjacent to the boundary line, including a case where a user of the mobile terminal device 50 is not on the pleasure boat. In this case, the determination unit 58b sets the inside flag stored in the work area of the storage unit 55 to "OFF" (step S309), and proceeds to the processing in step S305.

Also, when the position information indicates that the position is included in the second area (Yes in step S308), the determination unit 58b further determines whether or not the inside flag stored in the work area of the storage unit 55 is "ON" (step S310).

At this point, when the inside flag is "OFF" (No in step S310), the status stored in the work area of the storage unit 55 is not updated to "during departure", and the flow proceeds to the processing in step S305. This is because when it is not confirmed that the flow of the position information on the pleasure boat 5 makes a transition in the order of "the first area", and "the second area", there is a high possibility that the pleasure boat 5 has not departed as described below.

On the other hand, when the inner side flag is "ON" (Yes in step S310), it is found that the flow of the position information on the pleasure boat 5 makes a transition in the order of "the first area", and "the second area". This indicates that the pleasure boat 5 has crossed the boundary line, which is equivalent to that the pleasure boat 5 has passed from the inside the port to the outside the port in the entrance of the port set by the marina. In this case, the determination unit 58b updates the status stored in the work area of the storage unit 55 to "during departure" (step S311). Along with this, the upload unit 58c uploads the departure notification including the marina ID and the departure ID to the server device 10 (step S312), and proceeds to the processing in step S313.

When the status is updated to "during departure" like this, as illustrated in FIG. 11, the acquisition unit 58a acquires position information measured by the position detection unit 54 (step S313). The determination unit 58b then determines whether or not the coordinates of latitude and longitude included in the position information acquired by the acquisition unit 58a are included in the second area stored in the work area of the storage unit 55 (step S314).

At this point, when the position information indicates that the position is included in the second area (Yes in step S314), it may be determined that the pleasure boat 5 during departure has approached the second area adjacent to the boundary line. In this case, the determination unit 58b sets the outside flag stored in the work area of the storage unit 55 to "ON" (step S315), and proceeds to the processing in step S313.

When the position information indicates that the position is not included in the second area (No in step S314), the determination unit 58b further determines whether or not the position information indicates that the position is included in the first area stored in the work area of the storage unit 55 (step S316).

At this point, when the position information indicates that the position is not included in the first area (No in step S316), it may be determined that the pleasure boat 5 during departure has not approached the second area adjacent to the boundary line. In this case, the determination unit 58b sets the outside flag stored in the work area of the storage unit 55 to "OFF" (step S317), and proceeds to the processing in step S313.

Also, when the position information indicates that the position is included in the first area (Yes in step S316), the determination unit 58b further determines whether or not the outside flag stored in the work area of the storage unit 55 is "ON" (step S318).

At this point, when the outside flag is "OFF" (No in step S318), the status stored in the work area of the storage unit 55 is not updated to "during arrival", and the flow proceeds to the processing in step S313. This is because when it is not confirmed that the flow of the position information of the mobile terminal device 50 makes a transition in the order of "the second area", and "the first area", there is a higher possibility that the mobile terminal device 50 is present on facilities such as the general road without passing through the second area.

On the other hand, when the outside flag is "ON" (Yes in step S318), it is found that the flow of the position information on the pleasure boat 5 makes a transition in the order of "the second area", and "the first area". This indicates that the pleasure boat 5 has crossed the boundary line, which is equivalent to that the pleasure boat 5 has passed from the outside the port to the inside the port in the entrance of the port set by the marina. In this case, the determination unit 58b updates the status stored in the work area of the storage unit 55 to "during an arrival" (step S319). Along with this, the upload unit 58c transmits the arrival notification including the marina ID and the departure ID to the server device 10 (step S320), and completes the processing.

[Aspect of Effects]

As described above, the navigation management support system 1 according to this embodiment receives designation of a line on the map of a sea area where a port is present, and determines arrival or departure of a vessel according to movement of position information on the vessel between the first area and the second area which are defined by the line as a boundary. Therefore, with the navigation management support system 1 according to this embodiment, the boundary for determining arrival or departure to or from a port may be flexibly set. Furthermore, with the navigation management support system 1 according to this embodiment, it is possible to implement the navigation support service without providing a port with excessive equipment such as distance sensors by a marina except for the mobile terminal devices 50 owned by the crew members of the pleasure boat 5.

[Second Embodiment]

So far, an embodiment related to the disclosed device has been described above, and the present disclosure may be implemented in various different forms other than the embodiment described above. Thus, another embodiment included in the present disclosure will be described below.

[Arrival and Departure Determination]

In the embodiment, a case has been exemplified where both departure and arrival of the pleasure boat 5 are determined. However, only one of departure and arrival may be determined. For instance, when only departure is determined, the processing may be completed in step S312 illustrated in FIG. 10. Also, when only arrival is determined, the following steps may be performed: an arrival ID is assigned according to an entrance notice submitted to a marina, navigation data 13c is generated by replacing the departure ID with the arrival ID, the status set in step S301 illustrated in FIG. 10 is set to "during departure", the processing in step S302 to step S304 is performed, and the processing in step S313 to step S320 illustrated in FIG. 11 is performed. Consequently, it is possible to determine arrival and departure when a vessel departs from a marina which is a subscriber of the navigation support service and makes a port call at another marina which is not a subscriber and also when a vessel departs from another marina which is a not subscriber and makes a port call at a marina which is a subscriber of the navigation support service.

[Boundary Line]

In the embodiment, a case has been exemplified where a boundary line is defined by the coordinates of two points: a start point and an end point. However, a boundary line may be defined by the coordinates of three or more points. For instance, in the case of four points, a boundary line may also be defined as a polygonal line in which the coordinates of a start point, a relay point 1, a relay point 2, and an end point are given, and three line segments consisting of the line segment between the start point and the relay point 1, the line segment between the relay point 1 and the relay point 2, and the line segment between the relay point 2 and the end point are connected via the relay point 1 and the relay point 2.

[Distribution and Integration]

The components of each of devices illustrated may not be physically constructed as illustrated. In other words, a specific topology of distribution and integration of the devices is not limited to what is illustrated, and all or part of the devices may be configured to be functionally or physically distributed and integrated in any units according to various loads and use conditions. For instance, the display unit 15a, the receiving unit 15b, the setting unit 15c, the distribution unit 15d, the recording unit 15e, or the notification unit 15f may be coupled to each other as external devices of the server device 10 through a network. Also, part or all of the processing belonging to the navigation support App execution unit 58 may be coupled to each other as external devices of the mobile terminal device 50 through a network. Also, the server device 10 may include the acquisition unit 58a, the determination unit 58d, and the line data 55a, the position detected by the position detection unit 54 of the mobile terminal device 50 may be transmitted to the server device 10 by the upload unit 58c, and the server device 10 may acquire the position information on the mobile terminal device 50, and may determine arrival or departure.

[Port Arrival and Departure Determination Program]

The various types of processing described in the embodiment may be implemented by a computer such as a personal computer or a workstation executing a program prepared in advance. Thus, an example of a computer that executes a port arrival and departure determination program having the same function as that of the embodiment will be described below using FIG. 12.

Figure 12:
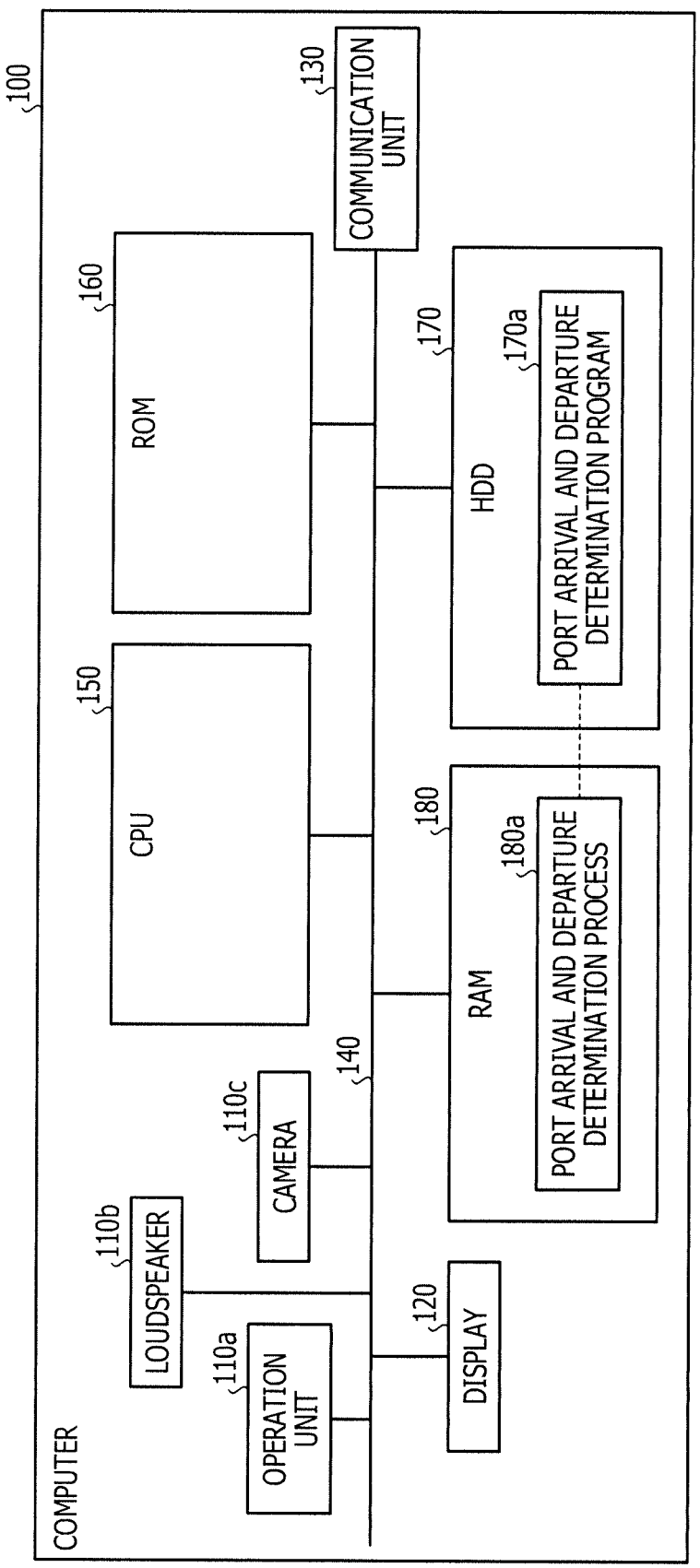
FIG. 12 is a diagram illustrating a hardware configuration example of a computer that executes a port arrival and departure determination program according to the first embodiment and a second embodiment.

FIG. 12 is a diagram illustrating a hardware configuration example of a computer that executes a port arrival and departure determination program according to the first embodiment and a second embodiment. As illustrated in FIG. 12, the computer 100 has an operation unit 110a, a loudspeaker 110b, a camera 110c, a display 120, and a communication unit 130. In addition, the computer 100 has a CPU 150, a ROM 160, a HDD 170, and a RAM 180. The units of these 110 to 180 are coupled to each other via a bus 140.

As illustrated in FIG. 12, the HDD 170 stores a port arrival and departure determination program 170a achieving the same function as that of the acquisition unit 58a, the determination unit 58b, and the upload unit 58c presented in the first embodiment. The port arrival and departure determination program 170a may be integrated or separated similarly to the acquisition unit 58a, the determination unit 58b, and the upload unit 58c illustrated in FIG. 8. In other words, the HDD 170 does not have to store all the data presented in the first embodiment, and may store data used for processing.

Under such an environment, the CPU 150 reads the port arrival and departure determination program 170a from the HDD 170, and loads the read program into the RAM 180. Consequently, the port arrival and departure determination program 170a functions as the port arrival and departure determination process 180a as illustrated in FIG. 12. The port arrival and departure determination process 180a loads various data read from the HDD 170 into an area assigned to the port arrival departure determination process 180a among the storage areas included in the RAM 180, and performs various types of processing using the loaded various data. For instance, an example of processing performed by the port arrival and departure determination process 180a includes the processing illustrated in FIGS. 10 and 11. It is to be noted that all the processing units presented in the first embodiment do not have to be operated in the CPU 150, and it is sufficient that processing units corresponding to the processing to be performed be virtually implemented.

It is to be noted that the port arrival and departure determination program 170a does not have to be stored in the HDD 170 or the ROM 160 from the first. For instance, the program are stored in a flexible disk inserted in the computer 100, so-called a "portable physical medium" such as a FD, a CD-ROM, a DVD disk, a magneto-optical disc, and an IC card. The computer 100 may obtain each program from the portable physical medium and may execute the program. Alternatively, each program may be stored in another computer or a server device coupled to the computer 100 via a public line, the Internet, a LAN, or a WAN, and the computer 100 may obtain and execute each program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A system for determination of port arrival and departure, the system comprising:
    a memory; and
    a processor coupled to the memory,
    wherein the processor:
        displays a map including sea areas;
        receives designation of a line on the displayed map;
        sets, as a first area, an area on a right side of the line in a direction which is specified by a reception order of a start point and an end point of the line and sets, as a second area, an area on a left side of the line in the direction;
        obtains position information on a vessel;
        sets a first flag to an ON-state when determining the position information indicates that the vessel is within the first area and obtains the position information on the vessel again;
        sets a second flag to the ON-state when determining the position information indicates that the vessel is within the second area and obtains the position information on the vessel again; and
        determines departure from a port of the vessel when the vessel is within the second area and the first flag is the ON-state and determines arrival to the port of the vessel when the vessel is within the first area and the second flag is the ON-state.

2. The system according to claim 1, wherein when determining the position information indicates that the vessel is not within the first area and the second area, the processor sets the first flag to an OFF-state, and when determining the position information indicates that the vessel is not within the first area and is within the second area, the processor determines the departure of the vessel when the first flag is the ON-state.

3. The system according to claim 1, wherein when determining the position information indicates that the vessel is not within the second area and the first area, the processor sets the second flag to an OFF-state, and when determining the position information indicates that the vessel is not within the second area and is within the first area, the processor determines the arrival of the vessel when the second flag is the ON-state.

4. The system according to claim 1, wherein the processor determines that the movement from the first area to the second area is departure from the port or the movement from the second area to the first area is departure from the port according to which one of ends of the line is received first as the start point.

5. The system according to claim 1, wherein when the arrival to the port is determined, the processor transmits information on the vessel to a terminal associated with the port.

6. A port arrival and departure determination method comprising:
    displaying, by a computer, a map including sea areas;
    receiving designation of a line on the displayed map;
    setting, as a first area, an area on a right side of the line in a direction which is specified by a reception order of a start point and an end point of the line and sets, as a second area, an area on a left side of the line in the direction;
    obtaining position information on a vessel;
    setting a first flag to an ON-state when determining the position information indicates that the vessel is within the first area and obtaining the position information on the vessel again;
    setting a second flag to the ON-state when determining the position information indicates that the vessel is within the second area and obtaining the position information on the vessel again; and
    determining departure from a port of the vessel when the vessel is within the second area and the first flag is the ON-state and determining arrival to the port of the vessel when the vessel is within the first area and the second flag is the ON-state.

7. The port arrival and departure determination method according to claim 6, further comprising: when determining the position information indicates that the vessel is not within the first area and the second area, setting the first flag to an OFF-state, and when determining the position information indicates that the vessel is not within the first area and is within the second area, determining the departure of the vessel when the first flag is the ON-state.

8. The port arrival and departure determination method according to claim 6, when determining the position information indicates that the vessel is not within the second area and the first area, setting the second flag to an OFF-state, and when determining the position information indicates that the vessel is not within the second area and is within the first area, determining the arrival of the vessel when the second flag is the ON-state.

9. The port arrival and departure determination method according to claim 6, further comprising:
    determining, according to which one of ends of the line is received first, that the movement from the first area to the second area is departure from the port or the movement from the second area to the first area is departure from the port as the start point.

10. The port arrival and departure determination method according to claim 6, further comprising:
    transmitting, when the arrival to the port is determined, information on the vessel to a terminal associated with the port.

11. A non-transitory computer-readable recording medium recording a port arrival and departure determination program which causes a computer to execute a process, the process comprising:
    displaying, by a computer, a map including sea areas;
    receiving designation of a line on the displayed map;
    setting, as a first area, an area on a right side of the line in a direction which is specified by a reception order of a start point and an end point of the line and sets, as a second area, an area on a left side of the line in the direction;

obtaining position information on a vessel;

setting a first flag to an ON-state when determining the position information indicates that the vessel is within the first area and obtaining the position information on the vessel again;

setting a second flag to the ON-state when determining the position information indicates that the vessel is within the second area and obtaining the position information on the vessel again; and determining departure from a port of the vessel when the vessel is within the second area and the first flag is the ON-state and determining arrival to the port of the vessel when the vessel is within the first area and the second flag is the ON-state.

12. The non-transitory computer-readable recording medium according to claim 11, further comprising:

when determining the position information indicates that the vessel is not within the first area and the second area, setting the first flag to an OFF-state, and when determining the position information indicates that the vessel is not within the first area and is within the second area, determining the departure of the vessel when the first flag is the ON-state.

13. The non-transitory computer-readable recording medium according to claim 11, when determining the position information indicates that the vessel is not within the second area and the first area, setting the second flag to an OFF-state, and when determining the position information indicates that the vessel is not within the second area and is within the first area, determining the arrival of the vessel when the second flag is the ON-state.

14. The non-transitory computer-readable recording medium according to claim 11, further comprising:

determining, according to which one of ends of the line is received first, that the movement from the first area to the second area is departure from the port or the movement from the second area to the first area is departure from the port as the start point.

15. The non-transitory computer-readable recording medium according to claim 11, further comprising:

transmitting, when the arrival to the port is determined, information on the vessel to a terminal associated with the port.

* * * * *